United States Patent
Sella

(10) Patent No.: US 8,453,191 B2
(45) Date of Patent: May 28, 2013

(54) METHOD OF BROADCASTING AUDIO AND VIDEO DATA OVER A TIME-SLICING NETWORK, AN AUDIO AND VIDEO DATA PROCESSOR AND A DVB-H SYSTEM

(75) Inventor: Assaf Sella, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 902 days.

(21) Appl. No.: 12/234,534

(22) Filed: Sep. 19, 2008

(65) Prior Publication Data

US 2010/0077426 A1     Mar. 25, 2010

(51) Int. Cl.
*H04N 7/173*     (2011.01)

(52) U.S. Cl.
USPC ............ 725/118; 725/32; 725/54; 725/122

(58) Field of Classification Search
USPC .................................. 725/32, 54, 118, 122
See application file for complete search history.

(56) References Cited

U.S. PATENT DOCUMENTS

| | | | |
|---|---|---|---|
| 2006/0253600 A1* | 11/2006 | Hannuksela | 709/231 |
| 2007/0074267 A1* | 3/2007 | Clerget et al. | 725/136 |
| 2008/0216116 A1* | 9/2008 | Pekonen et al. | 725/39 |
| 2011/0088063 A1* | 4/2011 | Ben-Romdhane et al. | 725/46 |

OTHER PUBLICATIONS

Faria, et al.; DVB-H: Digital Broadcast Services to Handheld Devices; Proceedings of the IEEE, vol. 94, No. 1, Jan. 2006, pp. 194-209.

Dictionary Definition: the word "identify"—Merriam Webster, Sep. 19, 2012, http://www.merriam-webster.com/dictionary/identify, pp. 1-3.

* cited by examiner

*Primary Examiner* — Pankaj Kumar
*Assistant Examiner* — Sahar Baig
(74) *Attorney, Agent, or Firm* — Alan A. R. Cooper; Wade J. Brady, III; Frederick J. Telecky, Jr.

(57) ABSTRACT

An apparatus, a method of transmitting data having audio and video content over a broadcast network employing time-slicing, a DVB-H system and an audio and video data processor. In one embodiment the method includes: (1) identifying points of a data stream corresponding to a beginning of each time-slice of a transmission stream, having multiple time-slices, to be used to transmit the data stream via a broadcast network, the data stream including an audio and a video stream, (2) injecting a synchronization packet at the points for each of the audio and video streams and (3) transmitting the transmission stream having the synchronization packets via the broadcast network.

16 Claims, 4 Drawing Sheets

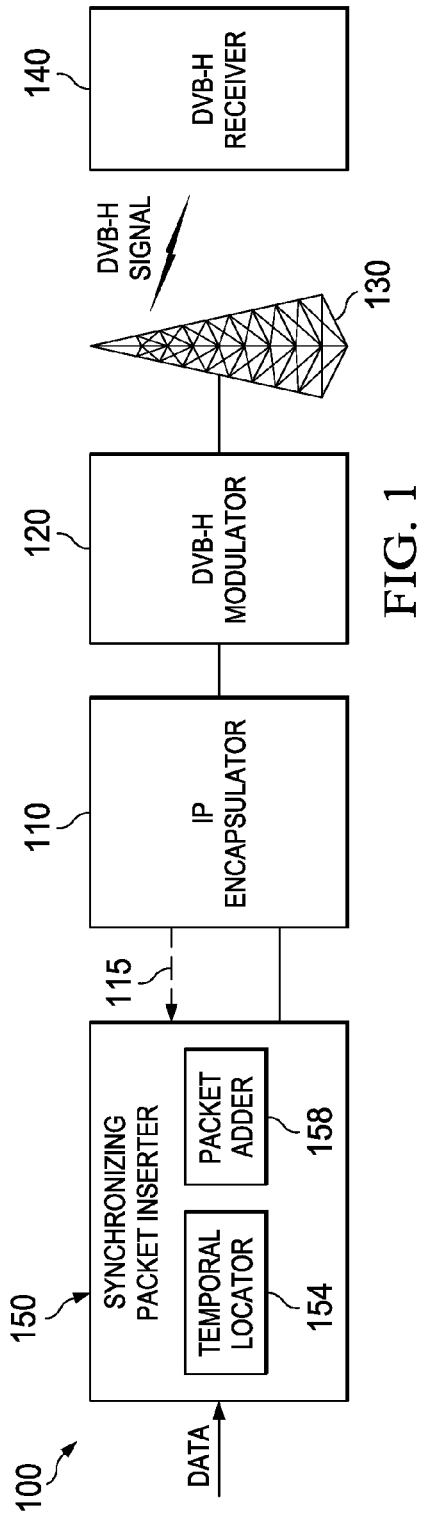
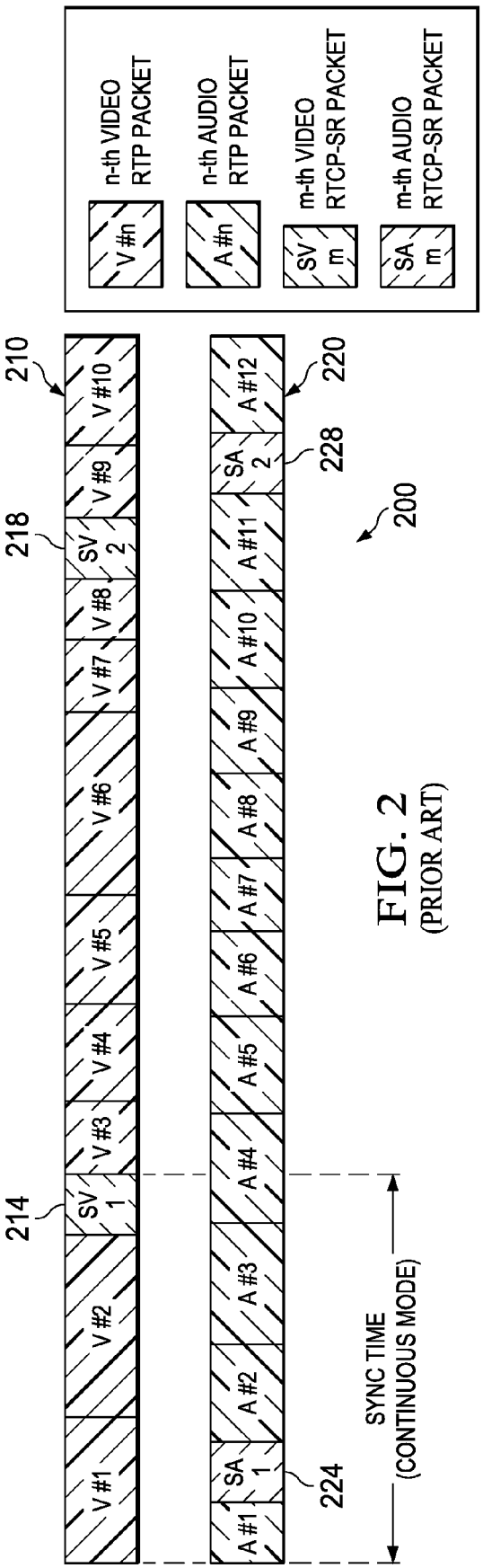
FIG. 1
FIG. 2 (PRIOR ART)

METHOD OF BROADCASTING AUDIO AND VIDEO DATA OVER A TIME-SLICING NETWORK, AN AUDIO AND VIDEO DATA PROCESSOR AND A DVB-H SYSTEM

TECHNICAL FIELD OF THE INVENTION

The invention is directed, in general, to multimedia broadcast systems and, more specifically, to synchronizing the multimedia of the broadcast systems.

BACKGROUND OF THE INVENTION

Multimedia broadcasts include the transmission of digital data streams having both audio and video content. In some multimedia broadcast systems, the digital data is transmitted using time-multiplexing. Digital Video Broadcasting-Handheld (DVB-H) is an example of such a system. DVB-H, which is based on the DVB-Terrestrial (DVB-T) standard, is a standard for the delivery of multimedia content (i.e., audio and video content of digital TV, or DTV) to small handheld terminals including cellular telephones, personal digital assistants, etc. Unlike DVB-T, the DVB-H standard uses time-slicing to reduce power consumption for handheld, battery-powered receivers. Time-slicing is a time-multiplexing technique where bursts of data are transmitted periodically allowing a receiver to power off when inactive.

In DVB-H systems, IP datagrams are transmitted as data bursts in time slots designated through time-slicing technology. Each individual TV service in a DVB-H signal is transmitted as the data bursts allowing the receiver to go into a sleep mode and waking when the service to which it is "tuned" is transmitted. Thus, the front end of a DVB-H compliant receiver can switch-on only for the time interval when the data burst of a selected service, such as a selected DTV channel, is being transmitted. Within this short period of time a high data rate is received and can be placed in a buffer of the receiver for storage or immediate playback.

Channel change time is one of the important parameters in a mobile DTV system. The channel change time in a DVB-H system is composed of the physical and link-layer (LL) change-time, and the upper layer change time. The physical & LL change-time is determined by the time-slice parameters, such as burst-size and cycle-time. Typically, these parameters can be optimized to provide a good trade-off between a short channel-change time and reduced power consumption. Nevertheless, an improved channel-change time while maintaining reduced power consumption would be beneficial in the art.

SUMMARY OF THE INVENTION

To address the above-discussed deficiencies of the prior art, the disclosure provides an apparatus. In one embodiment, the apparatus includes: (1) a processor, (2) a temporal locator configured to identify points of a data stream corresponding to a beginning of each time-slice of a transmission stream having multiple time-slices used to transmit the data stream via a broadcast system, the data stream including an audio and a video stream and (3) a packet inserter configured to inject a synchronization packet at the points for each of the audio and video streams.

In another aspect, the disclosure provides a method of transmitting data having audio and video content over a broadcast network employing time-slicing. In one embodiment the method includes: (1) identifying points of a data stream corresponding to a beginning of each time-slice of a transmission stream, having multiple time-slices, to be used to transmit the data stream via a broadcast network, the data stream including an audio and a video stream, (2) injecting a synchronization packet at the points for each of the audio and video streams and (3) transmitting the transmission stream having the synchronization packets via the broadcast network.

In yet another aspect, the disclosure provides a DVB-H system. In one embodiment, the DVB-H system includes: (1) an IP encapsulator configured to encapsulate, based on multi-protocol encapsulation (MPE), and time-slice a data stream of IP datagrams having audio and video content to generate an elementary stream (ES) having multiple time-slices for transmission, (2) a DVB-H modulator configured to modulate the ES for the transmission and (3) a synchronizing packet inserter configured to inject an RTCP-SR packet in both the audio and video content for each of the time-slices. The synchronizing packet inserter includes: (3A) a temporal locator configured to identify points of the data stream corresponding to a beginning of each of the time-slices and (3B) a packet inserter configured to inject an RTCP-SR packet at the points for both the audio and video content of the data stream.

In still another aspect, the disclosure provides an audio and video data processor. In one embodiment, the processor includes: (1) a data encoder configured to generate a compressed data stream from incoming data having audio and video streams and (2) a synchronizing packet inserter configured to insert synchronization packets in the compressed data stream for subsequent synchronization of audio and video content therein. The synchronizing packet inserter includes: (2A) a temporal locator configured to identify points of the compressed data stream corresponding to a beginning of each time-slice of a transmission stream having multiple time-slices used to transmit the compressed data stream via a broadcast system and (2B) a packet inserter configured to inject the synchronization packets at the points for each of the audio and video content.

BRIEF DESCRIPTION OF THE DRAWINGS

For a more complete understanding of the invention, reference is now made to the following descriptions taken in conjunction with the accompanying drawings, in which:

FIG. 1 is a system diagram of an embodiment of a multimedia broadcast system employing time-slicing technology and having a synchronized packet inserter constructed according to the principles of the invention;

FIG. 2 is a diagram representing an audio and video stream of a multimedia broadcast system;

DETAILED DESCRIPTION

Figure 3:
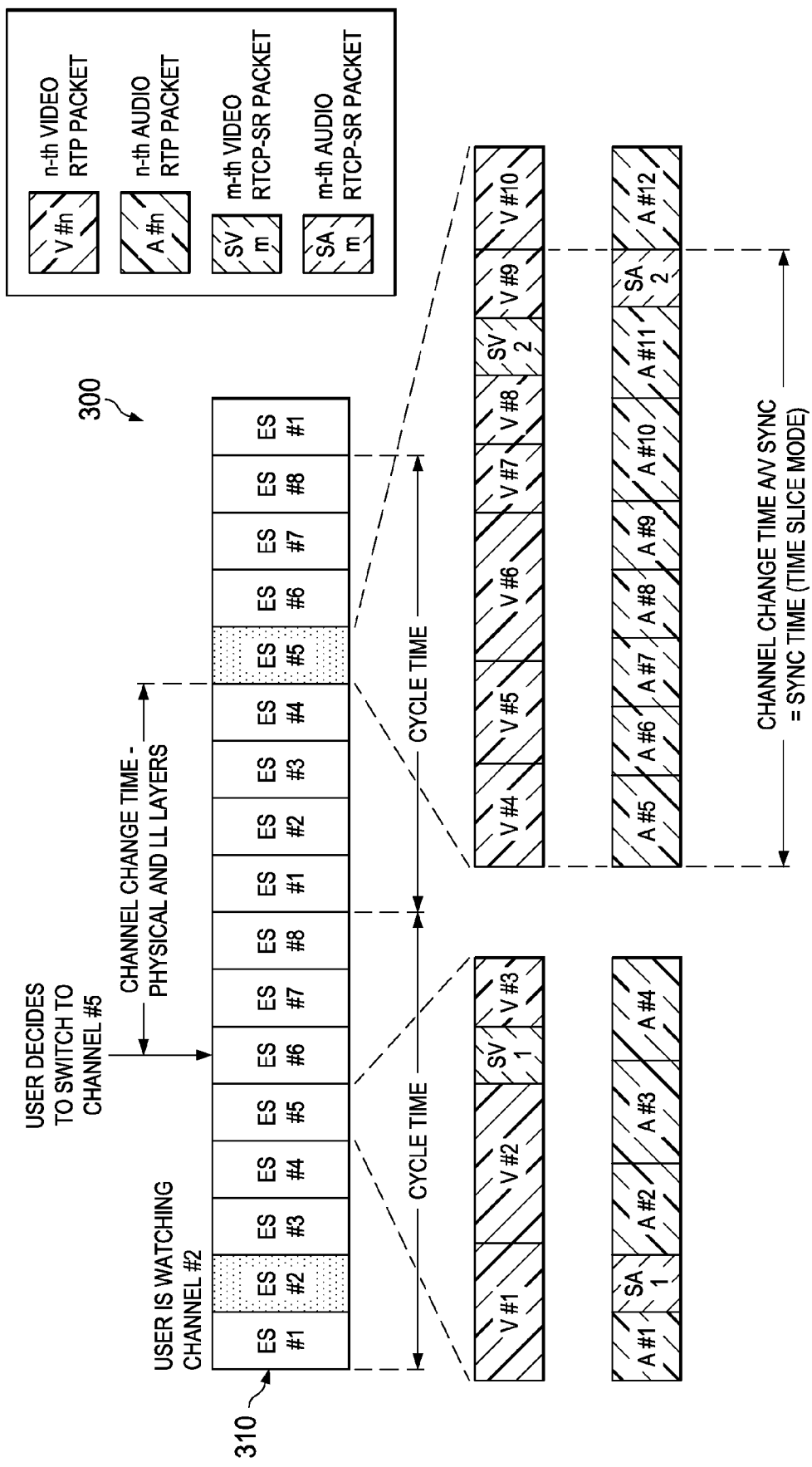
FIG. 3 is a diagram representing the channel change time of video and audio streams of a DVB-H system.

The disclosure provides how to reduce the channel change time of multimedia digital broadcasts systems that use time-slicing technology by injecting synchronization packets in the multimedia streams. The disclosure introduces injecting synchronization packets in each timeframe of the audio and video content of data streams to provide improved synchronization after a channel change. Considering the DVB-H standard, for example, the disclosure recognizes the upper-layers in the DVB-H protocol may increase the channel change time, e.g., due to the time it takes the audio and video decoders to synchronize on the new stream selected. To reduce the channel change time of the upper layers, the disclosure introduces injecting synchronization packets at the beginning of each time-slice of the audio and video streams in DVB-H compliant systems to improve synchronization.

FIG. 1 is a system diagram of an embodiment of a multimedia broadcast system 100 employing time-slicing technology and having a synchronized packet inserter constructed according to the principles of the invention. The multimedia broadcast system 100 is a media distribution system that employs time-slicing to transmit data (i.e., a time-slicing system). In the illustrated embodiment, the multimedia broadcast system 100 is a DVB-H system for transmitting DTV. In another embodiment, the multimedia broadcast system 100 may be another system that employs time-slicing such as a system that is compliant with the Advanced Television Systems Committee (ATSC) standard for mobile devices (ATSC-MH).

The multimedia broadcast system 100 includes an IP encapsulator 110, a DVB-H modulator 120, a DVB-H antenna 130 and a DVB-H receiver 140. Each of these components may be configured and may operate as conventional components typically included in a DVB-H system. The multimedia broadcast system 100 also includes a synchronizing packet inserter 150. The multimedia broadcast system 100 may include additional components that are not illustrated or discussed but are typically included in conventional DVB-H compliant systems. More information regarding a DVB-H system can be found in the article "DVB-H: Digital Broadcast Services to Handheld Devices," by Gerard Faria, et al., Proceedings of the IEEE, Vol. 94, No. 1, January 2006, which is incorporated herein by reference in its entirety.

The IP encapsulator 110 receives an IP datastream and performs multi-protocol encapsulation (MPE) and time-slicing on the IP datastream to generate an elementary stream (ES) of data for transmission via the antenna 130. The DVB-H modulator 120 receives the ES and modulates the ES for transmission. The DVB-H receiver 140 receives the broadcast ES via the antenna 130.

The DVB-H receiver 140 can select a particular channel from the ES to view. Additionally, the DVB-H receiver 140 can switch between various channels of the ES. The synchronizing packet inserter 150 can assist in reducing the channel change time viewed by the DVB-H receiver 140 by inserting synchronization packets in each time-slice for both the audio and video streams. With the synchronization packets, the DVB-H receiver 140 can experience a reduced channel change time by improving synchronization time for the audio and video components of the received DVB-H signal. This is demonstrated more clearly with respect to FIGS. 2-4.

FIG. 2 is a diagram representing an audio and video stream of a multimedia broadcast system. Multimedia content such as video and audio streams are typically transmitted using the Real-time Transfer Protocol (RTT). Requests for Comments (RFCs) are usually used to define how the audio and video content is encapsulated in RTP packets. RFC 3984, for example, defines the encapsulation of H.264 video. H.264 is a standard from the International Telecommunication Union Telecommunications Standardization Sector (ITU-T) for video compression and may also be known as Moving Pictures Experts Group (MPEG)-4 Part 10 or MPEG-4 AVC (for Advanced Video Coding). An RTP packet has a header that contains a timestamp field that reflects the sampling instant of the first octet in the RTP data packet. The initial value of the timestamp is random. Using the timestamp a player can play the video or audio streams by themselves.

RTP timestamps from different media streams may advance at different rates and usually have independent, random offsets. Therefore, although these timestamps are sufficient to reconstruct the timing of a single stream, directly comparing RTP timestamps from different media, such as audio and video, is not effective for synchronization of the media streams.

Instead, for each medium the RTP timestamp is related to the sampling instant by pairing it with a timestamp from a reference clock (a "wall-clock" or Network Time Protocol (NTP) timestamp) that represents the time when the data corresponding to the RTP timestamp was sampled. The reference clock is shared by all the media types to be synchronized. The timestamp pairs are not transmitted in every data packet, but at a lower rate in RTP control packets (Real Time Control Packets-Sender Report (RTCP-SR)).

In FIG. 2, video stream 210 includes ten video RTP packets and two RTCP-SR packets designated 214 and 218. Audio stream 220 includes twelve audio RTP packets and two audio RTCP-SR packets designated 224 and 228. In a typical (e.g., Internet based) streaming application using a one-time sync-acquisition phase, the audio and video components of the DVB-H signal (i.e., the video stream 210 and the audio stream 220) will be synchronized after receiving the first RTCP-SR video packet 214 and the first RTCP-SR audio packet 224.

Turning now to synchronizing in a multimedia broadcast system employing time-slicing, FIG. 3 illustrates a diagram representing the channel change time of video and audio streams of a DVB-H system. FIG. 3 includes a portion of an elementary stream (ES) 310 having 8 time-slices ES #1, ES #2, . . . , ES #8 within each cycle. Each time-slice, also referred to as time frames, includes audio and video content as IP datagrams encapsulated, for example by the IP encapsulator 110 of FIG. 1, according to MPE. The audio and video content in each time-slice is represented by the exploded views of the audio and video data packets of channel five during each cycle of the ES 310.

FIG. 3 demonstrates the additional channel change time in a DVB-H system due to synchronization between the audio and video components of the new streaming channel that was selected. In FIG. 3, a user is watching channel 2 and then decides to switch to channel 5. A designated time for changing the channel is due to the physical and LL layers of the DVB-H system as noted in FIG. 3. The additional channel change time is due to synching the RTCP-SR packets of the audio and video components of the new selected channel (i.e., channel five in this example). After receiving the first RTCP-SR packets of both the audio and video streams, then the receiver 140 can synchronize the two media components. This is considered a one-time sync-acquisition phase.

Figure 4:
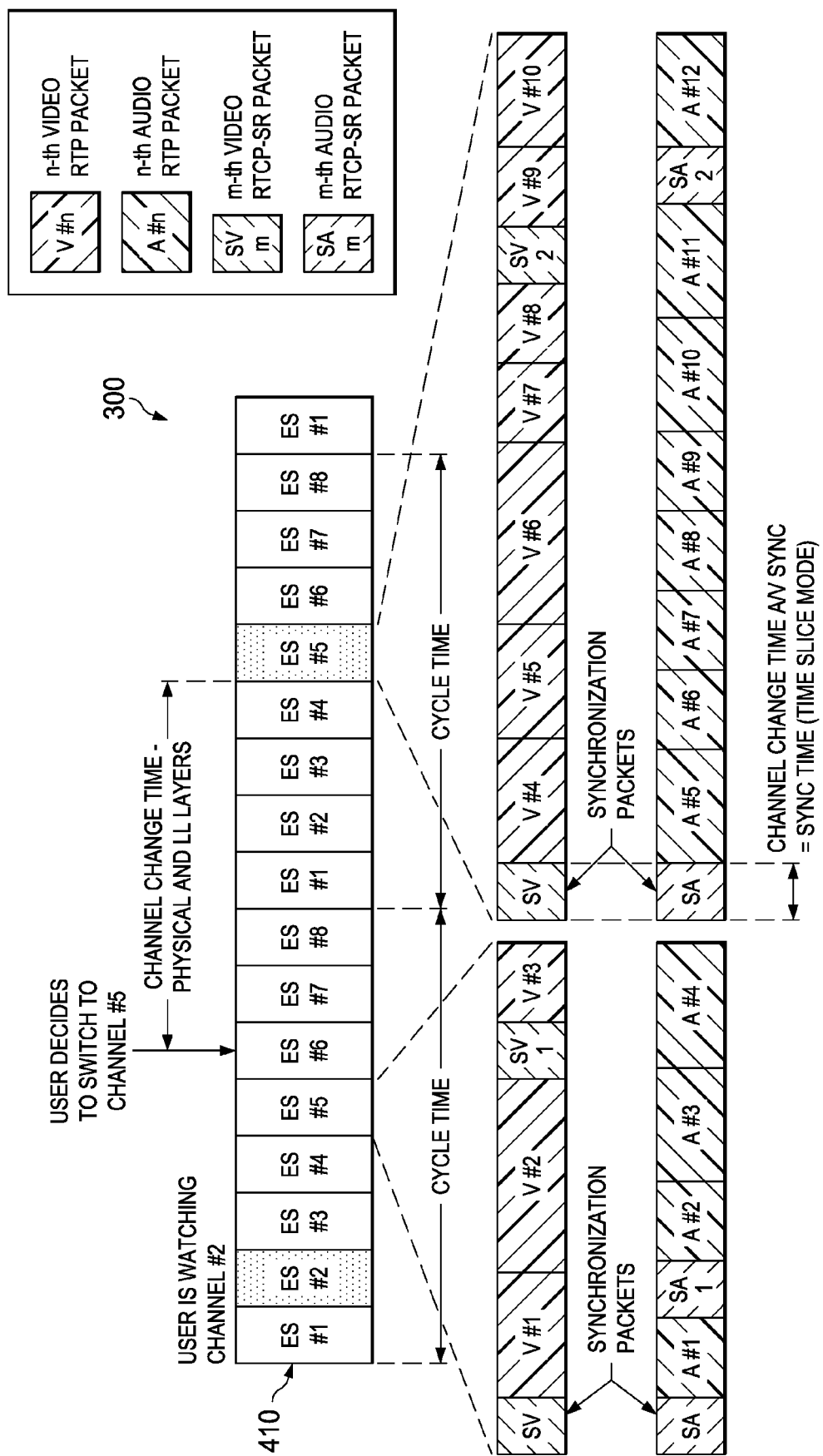
FIG. 4 is a diagram representing the channel change time of a multimedia broadcast system carried out according to the principles of the invention.

Turning now to FIG. 4 is a diagram representing the channel change time of a multimedia broadcast system carried out according to the principles of the invention. In FIG. 4, the multimedia broadcast system is a DVB-H system that transmits an ES 410 including eight time-slices within each cycle. Unlike the ES 310 of a conventional DVB-H system illustrated in FIG. 3, the ES 410 includes synchronizing packets, SPV and SPA, at the beginning of each time-slice for both the video and the audio content, respectively. By injecting the synchronization information for both the audio and video in the RTP layer, channel change time for a DVB-H system can be shortened.

In the illustrated embodiment, the synchronization packets are RTCP-SR packets. To reduce the channel change time, the synchronizing packet inserter 150 inserts the RTCP-SR packets at the beginning of each time-slice of the ES 410. Though this requires the addition of extra RTCP-SR packets, the overhead due to the extra RTCP-SR packets may be considered negligible since the basic packet consumes only 28B (compared to tens of Kb of an intra frame (i.e., I-Frame) generated by MPEG compression.

The synchronizing packet inserter 150 of FIG. 1, therefore, can improve channel-change time by inserting additional RTCP-SR packets in the audio and video streams of each time-slice. The synchronizing packet inserter 150 may be embodied as a series of operating instructions on a readable medium of a computer that direct the operation of the computer. In some embodiments, the synchronizing packet inserter 150 may be implemented as part of a data encoder configured to compress data to generate a lower bit rate for transmission. The data encoder can be compliant with the H.264 ITU-T standard. In other embodiments, the synchronizing packet inserter 150 may be a stand alone device coupled to the IP encapsulator 110.

The synchronizing packet inserter 150 includes a temporal locator 154 that determines the beginning of a time-slice in both the audio and video streams of the data stream. Additionally, the synchronizing packet inserter 150 includes a packet adder 158 that inserts the synchronization packets at the beginning of the audio and video content in each time-slice of the data stream.

The temporal locator 154 synchronizes the insertion of the synchronization packets with the beginning of the audio and video streams in the time frame. The temporal locator 154 determines the beginning of each time-slice based on feedback from the IP encapsulator 110 via the feedback line 115. The temporal locator 154 employs the feedback to identify points of the data stream corresponding to the beginning of time-slices used to transmit the datastream. The temporal locator 154 is configured to identify the points based on a feedback line 115 from the IP encapsulator 110 that signals the actual beginning of each of the time-slices.

In other embodiments, a temporal locator may be configured to identify the points based on a repetition period that is the same as or a multiple of a period of the time-slices. The period of the time-slices can be determined based on the parameters of the broadcast system. This period can then be used to time the insertion of the synchronization packets. Alternatively, the temporal locator may be configured to identify the points associated with the video content based on a location of an I-frame of the video stream generated during MPEG compression.

Figure 5:
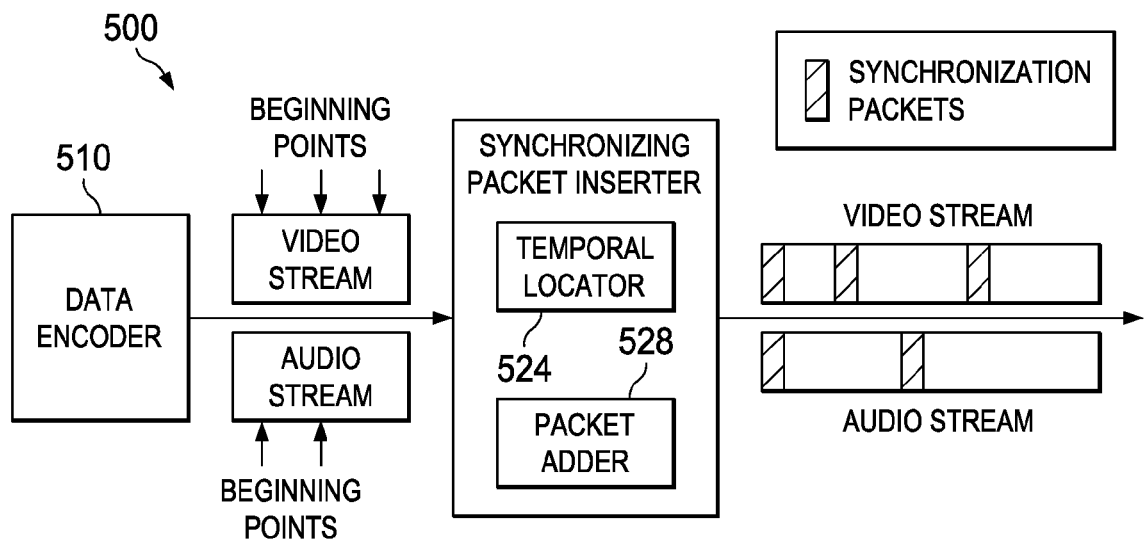
FIG. 5 is a block diagram of an embodiment of a multimedia data processor constructed according to the principles of the invention.

FIG. 5 is a block diagram of an embodiment of a multimedia data processor 500 constructed according to the principles of the invention. The multimedia data processor 500 includes a data encoder 510 and a synchronizing packet inserter 520. The synchronizing packet inserter 520 includes a temporal locator 524 and a packet adder 528.

The multimedia data processor 500 may be embodied as a series of operating instructions stored on a computer readable medium that directs the operation of a computing device. In some embodiments, multimedia data processor 500 may be embodied as a dedicated device that is constructed of special-purpose hardware employing a software program to direct its operation. In some embodiments, the data encoder 510 and the synchronizing packet inserter 520 may be incorporated in a single device. In other embodiments, the data encoder 510 and the synchronizing packet inserter 520 may be located in separate devices coupled together.

The data encoder 510 is configured to compress an input datastream to reduce a bit rate of the datastream. The data encoder 510 may be configured as and operate according to an H.264 ITU-T encoder.

The synchronizing packet inserter 520 is configured to insert synchronization packets in the compressed data stream for subsequent synchronization of audio and video content therein. The temporal locator 524 is configured to identify points of the compressed data stream corresponding to a beginning of each time-slice of a transmission stream having multiple time-slices used to transmit the compressed data stream via a broadcast system. The packet inserter 528 is configured to inject the synchronization packets at the points for each of the audio and video content in each time-slice. As discussed with respect to FIG. 1, the broadcast system can be a DVB-H compliant system that broadcasts an ES.

In some embodiments, the temporal locator 524 is configured to identify the points based on a repetition period that is the same as or a multiple of a period of the time-slices. In other embodiments, the temporal locator 524 is configured to identify the points based on a feedback line from an IP encapsulator of the broadcast system. The feedback line provides a signal that indicates the actual beginning of each time-slice. The temporal locator 524 can use the feedback signal to identify the beginning points of the time-slices on the compressed data stream. In an alternative embodiment, the temporal locator 524 may be configured to identify the points associated with the video stream of the compressed data stream based on a location of an I-frame of the video stream.

The synchronization packets can be inserted prior to IP encapsulation of the compressed data stream. The synchronization packets may be RTCP-SR packets. The packet adder 528 can insert the RTCP-SR packets as typically done in conventional systems.

Figure 6:
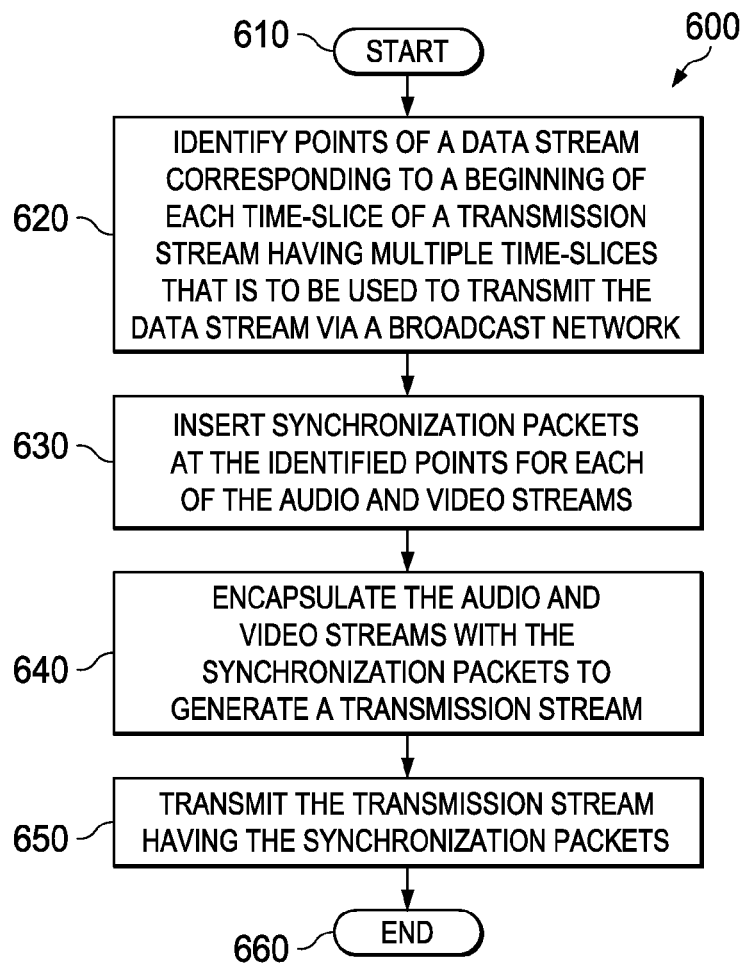
FIG. 6 is a flow diagram of an embodiment of a method of transmitting multimedia data over a broadcast network employing time-slicing carried out according to the principles of the invention.

FIG. 6 is a flow diagram of an embodiment of a method 600 of transmitting multimedia data over a broadcast network employing time-slicing carried out according to the principles of the invention. The broadcast network may be a DVB-H network. In other embodiments, the broadcast network may another network that employs time-slicing, such as, DVB-SH (DVB-Satellite services to handhelds), DVB-IPDC (DVB for IP datacasting) and DVB-H2. The method begins in a step 610 with an intent to transmit the data.

After starting, the method 600 continues in a step 620 by identifying points of a data stream corresponding to a beginning of each time-slice of a transmission stream having multiple time-slices that is to be used to transmit the data stream via a broadcast network. The data stream includes an audio and a video stream and the corresponding points may be identified by various methods including using feedback from an IP encapsulator.

After identifying the corresponding points, synchronization packets are inserted at the points for each of the audio and video streams in a step 630. The synchronization packets may be RTCP-SR packets for audio and video streams that are inserted according to conventional methods. The compressed data stream having the synchronization packets is then encapsulated in a step 640 to generate a transmission stream. The encapsulation may be performed by an IP encapsulator to form an ES for transmission.

The transmission stream having the synchronization packets is then transmitted via the broadcast network in a step 650.

The broadcast system used for transmission may be a DVB-H compliant system. The method of transmitting 600 then ends in a step 660.

The above-described system, apparatus (e.g., the synchronizing packet inserter) and methods may be embodied in or performed by various conventional digital data processors or computers, wherein the computers are programmed or store executable programs of sequences of software instructions to perform one or more of the steps of the methods, e.g., steps of the method of FIG. 6. The software instructions of such programs may be encoded in machine-executable form on conventional digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, e.g., one or more of the steps of the method of FIG. 6.

Those skilled in the art to which the invention relates will appreciate that other and further additions, deletions, substitutions and modifications may be made to the described embodiments without departing from the scope of the invention.

What is claimed is:

1. An apparatus, comprising:
    a processor;
    a temporal locator configured to identify points of a data stream corresponding to a beginning of each time-slice of a transmission stream having multiple time-slices used to transmit said data stream via a broadcast system, said data stream including an audio and a video stream; and
    a packet inserter configured to inject a synchronization packet at said points for each of said audio and video streams,
    wherein said broadcast system is a DVB-H compliant system and said transmission stream is an elementary stream, and
    wherein said synchronization packet is an RTCP-SR packet.

2. The apparatus as recited in claim 1 wherein said temporal locator is configured to identify said points based on a repetition period that is the same as or a multiple of a period of said time-slices.

3. The apparatus as recited in claim 1 wherein said temporal locator is configured to identify said points based on a feedback line from an IP encapsulator of said broadcast system that signals the actual beginning of each said time-slice.

4. The apparatus as recited in claim 1 wherein said temporal locator is configured to identify said points associated with said video stream based on a location of an I-frame of said video stream.

5. A method of transmitting data having audio and video content over a broadcast network employing time-slicing, comprising:
    identifying points of a data stream corresponding to a beginning of each time-slice of a transmission stream, having multiple time-slices, to be used to transmit said data stream via a broadcast network, said data stream including an audio and a video stream;
    injecting a synchronization packet at said points for each of said audio and video streams; and
    transmitting said transmission stream having said synchronization packets via said broadcast network,
    wherein said broadcast system is a DVB-H compliant system and said transmission stream is an elementary stream, and
    wherein said synchronization packet is an RTCP-SR packet.

6. The method as recited in claim 5 further comprising encapsulating said data stream having said synchronization packets to generate said transmission stream.

7. The method as recited in claim 5 wherein said identifying said points is based on a repetition period that is the same as or a multiple of a period of said time-slices.

8. The method as recited in claim 5 wherein said identifying said points is based on a feedback line from an IP encapsulator of said broadcast system that signals the actual beginning of each said time-slice.

9. The method as recited in claim 5 wherein said identifying said points associated with said video stream is based on a location of an I-frame of said video stream.

10. The method as recited in claim 6 wherein said data stream is an IP data stream and said encapsulating is IP encapsulating.

11. A Digital Video Broadcasting-Handheld (DVB-H) system, comprising:
    an IP encapsulator configured to encapsulate, based on multi-protocol encapsulation (MPE), and time-slice a data stream of IP datagrams having audio and video content to generate an elementary stream (ES) having multiple time-slices for transmission;
    DVB-H modulator configured to modulate said ES for said transmission; and
    a synchronizing packet inserter configured to inject an RTCP-SR packet in both said audio and video content for each of said time-slices, said synchronizing packet inserter comprising:
        a temporal locator configured to identify points of said data stream corresponding to a beginning of each of said time-slices, and
        a packet inserter configured to inject an RTCP-SR packet at said points for both said audio and video content of said data stream.

12. The DVB-H system as recited in claim 11 wherein said temporal locator is configured to identify said points based on a repetition period that is the same as or a multiple of a period of said time-slices.

13. The DVB-H system as recited in claim 11 wherein said temporal locator is configured to identify said points based on a feedback line from said IP encapsulator that signals the actual beginning of said each of said time-slices.

14. The DVB-H system as recited in claim 11 wherein said temporal locator is configured to identity said points associated with said video content based on a location of an I-frame of said video stream.

15. An audio and video data processor, comprising:
    a data encoder configured to generate a compressed data stream from incoming data having audio and video streams; and
    a synchronizing packet inserter configured to insert synchronization packets in said compressed data stream for subsequent synchronization of audio and video content therein, said synchronizing packet inserter comprising:
        a temporal locator configured to identify points of said compressed data stream corresponding to a beginning of each time-slice of a transmission stream having multiple time-slices used to transmit said compressed data stream via a broadcast system; and
        a packet inserter configured to inject said synchronization packets at said points for each of said audio and video content,
    wherein said broadcast system operates based on a DVB-H system, and wherein said synchronization packets are RCTP-SR packets.

16. The audio and video data processor as recited in claim 15 wherein said data encoder operates based on H.264 ITU-T standard.

* * * * *